United States Patent [19]

Ellenberger et al.

[11] 4,181,651

[45] Jan. 1, 1980

[54] METHOD FOR HYDROLYSIS OF CASEIN USING ORTHOPHOSPHOROUS ACIDS OR SALTS THEREOF AND MONTMORILLONITE

[75] Inventors: Willi Ellenberger, Sandmoorweg 34a, 2000 Hamburg 56, Fed. Rep. of Germany; Holger Blum, Hamburg, Fed. Rep. of Germany; Harald Muller-Zitzke; Ludwig Mascher, Jr., both of Bodenfelde, Fed. Rep. of Germany

[73] Assignee: Willi Ellenberger, Hamburg, Fed. Rep. of Germany

[21] Appl. No.: 930,215

[22] Filed: Aug. 2, 1978

[30] Foreign Application Priority Data

Aug. 5, 1977 [DE] Fed. Rep. of Germany ....... 2735297

[51] Int. Cl.$^2$ ............................ A23J 1/20; A23J 3/02; C07G 7/00

[52] U.S. Cl. ...................................... 260/119; 260/120

[58] Field of Search ................................ 260/119, 120

[56] References Cited

U.S. PATENT DOCUMENTS

| 917,062 | 4/1909 | Head ................................. 260/120 |
| 1,505,551 | 8/1924 | Funk et al. ...................... 260/119 X |
| 2,023,389 | 12/1935 | Iddings ........................... 260/119 X |
| 2,045,097 | 6/1936 | Otting ............................. 260/120 X |
| 2,115,316 | 4/1938 | Murray ........................... 260/119 X |
| 2,180,636 | 11/1939 | Kemmerer ...................... 260/119 X |
| 2,254,241 | 9/1941 | Pittman et al. ................. 260/120 X |
| 3,058,836 | 10/1962 | Sirota ............................. 260/119 X |
| 3,698,912 | 10/1972 | Winitz ............................. 424/319 |
| 4,055,555 | 10/1977 | Badertscher et al. ............ 260/119 |

OTHER PUBLICATIONS

Chem. Abstracts, vol. 50, 1956, 17271g–h, Lynch et al.
Chem. Abstracts, vol. 88, 1978, 35986v, Simov et al.
Merck Index, 1976, 9th Edition, pp. 6095–6096.

*Primary Examiner*—Howard E. Schain
*Attorney, Agent, or Firm*—Burgess, Ryan and Wayne

[57] ABSTRACT

The invention relates to a method for the hydrolysis of casein using non-oxidizing mineral acids at elevated temperatures, at which hydrolysis is performed in the presence of orthophosphorous acid or salts thereof acid-activated montmorillonite to inhibit discoloration at temperatures of 60°–100° C. The method in accordance with the invention is technically simple and can be undertaken economically and it supplies the desired protein hydrolysate with high yield without the formation of undesirable by-products, especially undesirable dark substances, which result in discoloration of the end product.

8 Claims, No Drawings

METHOD FOR HYDROLYSIS OF CASEIN USING ORTHOPHOSPHOROUS ACIDS OR SALTS THEREOF AND MONTMORILLONITE

The invention relates to a method for the hydrolysis of casein in the liquid phase with non-oxidising mineral acids.

During the hydrolysis of casein at elevated temperature when using non-oxidising mineral acids, apart from the desired protein hydrolysates, soluble and insoluble dark substances are also formed as by-products, which not only cause a deterioration in the purity and quality, but also the yield of protein hydrolysate. Admittedly it is possible, by reducing the reaction temperature during the hydrolysis of casein, to partially or completely prevent the formation of the undesirable dark substances, but as a result the reaction period is increased to values which are no longer acceptable. Attempts have already been made to produce uncoloured or only slightly coloured protein hydrolysates by undertaking the hydrolysis of casein at elevated temperatures using a non-oxidising mineral acid in the presence of sulphurdioxide or urea. However these methods have also proved inadequate to completely prevent the formation of the undesirable dark substances. Furthermore during this considerable quantities of new extraneous substances are formed such as ammonium sulphate, which in turn considerably reduce the quality of the protein hydrolysate for the foodstuffs or fodder sector.

Hence the aim of the invention is to develop a method by means of which it is possible, in a technically simple and yet effective way, to so hydrolyse casein using non-oxidising mineral acids at elevated temperatures that no undesirable by-products are encountered, and particularly no discoloration.

It has been found that this task can be solved in one method for the hydrolysis of casein using non-oxidising mineral acids at elevated temperatures by undertaking the hydrolysis in the presence of orthophosphorous acid and/or its salts, also in the presence of acid-activated montmorillonite to inhibit discoloration at temperatures of 60°–100° C.

The method in accordance with the invention is technically simple and economic to carry out and it supplies the desired protein hydrolysate with high yield without the formation of undesirable by-products, especially undesirable dark substances, which result in discoloration of the end product.

In the procedure in accordance with the invention the non-oxidising mineral acids employed for the hydrolysis of casein are the aqueous mineral acids usually employed, especially hydrochloric acid and/or sulphuric acid, with arbitrary concentration, but preferably in a concentration of up to roughly 20% by weight.

Hydrolysis is performed in accordance with the invention at a temperature of 60°–100° C., preferably from 80° to 95° C.

The orthophosphorous acid $H_3PO_3$ which is used as one of the additives in accordance with the invention can be added in arbitrary amounts, preferably in a quantity of up to 15% by weight, especially in a quantity of 0.1–10% by weight, and specially in a quantity of 0.2–2% by weight, all related to the content of non-oxidising mineral acid.

The free orthophosphorous acid used in accordance with the invention can be completely or partially replaced by one or more of its soluble salts, the amount used corresponding to the free acid. In accordance with the invention the soluble salts employed can be the alkali and/or earth alkali salts and/or the ammonium salt of this acid. Particularly suitable salts of orthophosphorous acid are the potassium, sodium, barium and ammonium salts. Preferably however the free orthophosphorous acid is used.

In the method in accordance with the invention, apart from orthophosphorous acid, acid-activated montmorillonite is used as a further additive. By montmorillonite is meant here an aluminium hydrosilicate which is found as a mineral with the approximate formula $Al_2O_3 \cdot 4SiO_2 \cdot H_2O + xH_2O$, which is characterised by a crypto-crystalline three-layer structure which consists of two-dimensional infinite macro-anions, which are electrostatically cross-linked via the cations of an intermediate layer.

Such an acid-activated montmorillonite can also be produced artificially, as described for example in German patent specification No. 1 211 643. The acid-activated montmorillonite used in accordance with the invention can be obtained on the open market, for example under the trade name "K-Katalysatoren" from the Girdler-Südchemie Katalysator GmbH.

The acid-activated Montmorillonite can be employed in arbitrary quantities, preferably 0.1–10% by weight, especially from 1–3% by weight, in each case related to the content of non-oxidising mineral acid.

When performing the procedure in accordance with the invention the ratio between non-oxidising mineral acid and amino nitrogen in the casein is kept within the range within which it is normally maintained during protein hydrolysis. The quantitative ratio normally employed is about 1 up to about 4 gramme equivalents of mineral acid per gramme atom amino nitrogen in the casein. If hydrolysis is to be performed under conditions of extreme care, then about 1.5 up to about 2 gramme equivalents of mineral acid are used per gramme atom of amino nitrogen in the casein and the reaction temperature is between 60° and 100° C. However in order to shorten the reaction period, it is also possible to use 2.5–4 gramme equivalents of mineral acid per gramme atom of amino nitrogen in the casein. A typical reaction batch for use in the procedure in accordance with the invention has the following composition:

Casein, in an amount which contains 1 gramme atom of aminonitrogen, 1.5–4 gramme equivalents of non-oxidising mineral acid in the form of an aqueous solution, 0.1–10 parts by weight or orthophosphorous acid and/or its salt, used for 100 parts by weight of the non-oxidising mineral acid employed, 0.1–10 parts by weight of acid activated montmorillonite used with 100 parts by weight of the non-oxidising mineral acid employed.

The reaction batch specified above, or a fraction or a multiple thereof, is made to react by heating for several hours up to the highest possible degree of hydrolysis, preferably up to a hydrolysis level of 75 to 99%, especially up to an hydrolysis level of 90–99% of the casein, and after cooling down it is filtered with the aid of active carbon, this giving the desired product.

The invention will now be illustrated by the following examples.

EXAMPLE 1

Several reaction batches consisting of commercially available casein with a dry solid content of 34.6% by weight and 20% by weight hydrochloric acid are hydrolysed at 95° C. up to a hydrolysis level of 90%. 2.5 gramme equivalents of hydrochloric acid are used per gramme atom of amino nitrogen in the casein.

Except for a blank test, the reaction batches contain the amounts of orthophosphorous acid and of a commerically available acid activated montmorillonite (Catalyst KSF) as specified in table I which follows. After cooling down the reaction mixture is stirred together with 0.4% by weight of active carbon and is filtered.

Then the residual colour of the reaction mixture obtained after filtration is established, related to the blank test specimen which is free from additive materials, as a criterion for the quantity of dark substances contained therein which have formed under the hydrolysis conditions.

Table I:

| Reaction batch No. | Parts by weight of $H_3PO_3$ to 100 parts by weight of HCl | Parts by weight of acid activated montmorillonite to 100 parts by weight of HCl | Hydrolysis level (%) | Residual colour (%) |
| --- | --- | --- | --- | --- |
| 1 | 0   | 0   | 90 | 100 |
| 2 | 3   | 0   | 90 | 95 |
| 3 | 0   | 3   | 90 | 80 |
| 4 | 1   | 2   | 90 | 50 |
| 5 | 2   | 1   | 90 | 45 |
| 6 | 0.5 | 3   | 90 | 40 |

EXAMPLE 2

The same commercially available casein as in example 1 is hydrolised up to 90% level using 20% by weight of sulphuric acid at 80° C. 2.5 gramme equivalents of sulphuric acid are used per gramme atom of amino nitrogen in casein. The reaction batches contain the quantities of orthophosphorous acid and acid activated montmorillonite (KSF catalyst) as specified in Table II which follows.

After cooling the reaction batches are stirred together with 0.3% by weight of active carbon and filtered and the residual colour of the resultant reaction product is determined as in example 1.

TABLE II:

| Reaction batch No. | Parts by weight $H_3PO_3$ to 100 parts by weight of $H_2SO_4$ | Parts by weight of acid activated montmorillonite to 100 parts by weight of $H_2SO_4$ | Hydrolysis level (%) | Residual colour (%) |
| --- | --- | --- | --- | --- |
| 7  | 0   | 0   | 90 | 100 |
| 8  | 3   | 0   | 90 | 91 |
| 9  | 0   | 3   | 90 | 88 |
| 10 | 1   | 2   | 90 | 35 |
| 11 | 2   | 1   | 90 | 30 |
| 12 | 0.2 | 1.5 | 90 | 40 |

We claim:

1. A method for the hydrolysis of casein which comprises contacting casein with from about one to four gram equivalents of non-oxidizing mineral acid per gram atom of amino nitrogen in the casein at a temperature from 60° to 100° C. in the presence of acid activated montmorillonite and a member selected from the group consisting of orthophosphorous acid, salts of orthophosphorous acid and mixtures thereof.

2. The method in accordance with claim 1, wherein the non-oxidising mineral acid is selected from the group consisting of aqueous hydrochloric acid, aqueous sulphuric acid and mixtures thereof.

3. A method in accordance with any one of claims 1 or 2 characterised by the use of the sodium, potassium, barium and/or ammonium salts as salts of the orthophosphorous acid.

4. A method in accordance with any one of claims 1, 2 or 3, characterised by the use of orthophosphorous acid and/or its salts in a quantity of up to 15% by weight related to the amount of non-oxidising mineral acid.

5. A method in accordance with claim 4, characterized by the use of orthophosphorous acid and/or its salts in an amount of 0.1 to 10% by weight related to the amount of non-oxidising mineral acid.

6. A method in accordance with claim 5, comprising the use of orthophosphorous acid or a salt thereof in an amount of 0.2 to 2% by weight based on the amount of non-oxidizing mineral acid.

7. A method according to claim 6 wherein acid-activated montmorillonite is present in an amount of 0.1 to 10% by weight of the non-oxidizing mineral acid.

8. A method according to claim 7 wherein the acid-activated montmorillonite is present in an amount of 1 to 3% by weight of the non-oxidizing mineral acid.

* * * * *

UNITED STATES PATENT OFFICE
CERTIFICATE OF CORRECTION

Patent No. 4,181,651      Dated January 1, 1980

Inventor(s) Willi Ellenberger

It is certified that error appears in the above-identified patent and that said Letters Patent are hereby corrected as shown below:

In the Abstract, line 4: After "thereof" insert --and--.

Column 2, line 50: "or" should be --of--.

Signed and Sealed this

Fifth Day of August 1980

[SEAL]

Attest:

SIDNEY A. DIAMOND

Attesting Officer     Commissioner of Patents and Trademarks